Jan. 31, 1933.   W. F. LOUGHMAN   1,895,672
FASTENING DEVICE
Filed Jan. 31, 1929
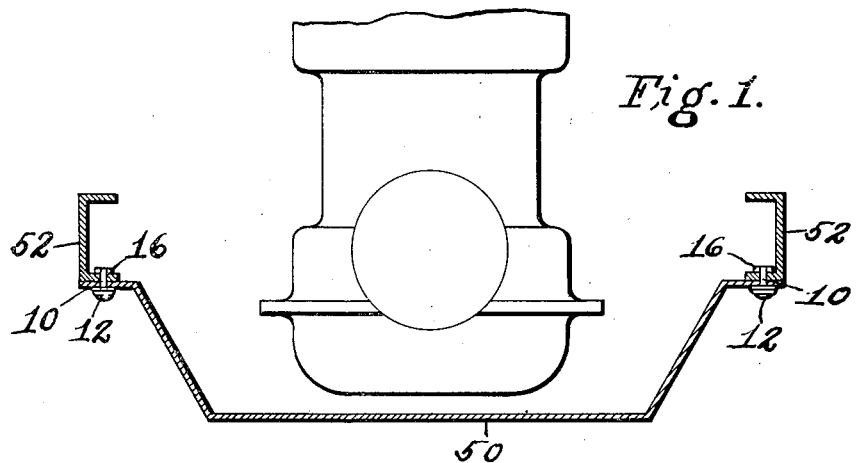
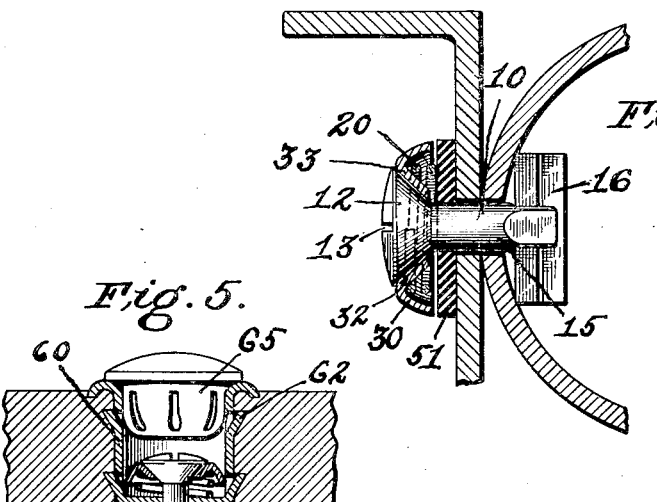
Inventor.
William F. Loughman
By J. Stanley Churchill
Atty.

Patented Jan. 31, 1933

1,895,672

UNITED STATES PATENT OFFICE

WILLIAM F. LOUGHMAN, OF BARRE, MASSACHUSETTS, ASSIGNOR TO KATCHES INC., OF BOSTON, MASSACHUSETTS, A CORPORATION OF MASSACHUSETTS

FASTENING DEVICE

Application filed January 31, 1929. Serial No. 336,567.

This invention relates to a fastening device and to a novel method of making the same.

The object of the invention is to provide a novel and improved fastening device which is particularly adapted for use in fastening together two members each of which is provided with an aperture and through which apertures when in a registering position, a portion of the fastening device extends, and whose construction is such as to enable such members to be fastened together in a convenient, rapid and secure manner.

A further object of the invention is to provide a novel method for the manufacture of a fastening device of the type described which lends itself to the economical production of the fastening device and enables fastening devices of superior strength and durability to be produced in large quantities at less expense than has heretofore been possible with any prior methods of producing fastening devices of this general type of which I am aware.

With these objects in view and such others as may hereinafter appear, the invention consists in the fastening device and in the method of making the same hereinafter described and particularly defined in the claims at the end of this specification.

In the drawing, Fig. 1 is a sectional view illustrating the use of the present fastening device for securing the splash pan to the supporting frame of a motor vehicle; Fig. 2 is a detail in perspective of a portion of the preferred form of fastening device; Fig. 3 is a similar view of a modified form; Fig. 4 is a sectional view illustrating the use of one of the preferred fastening devices in attaching an angle bar to a round pipe; and Fig. 5 is a sectional view of a modification to be referred to.

In general the present fastening device is adapted for use in securing together two members each of which is provided with an aperture, through both of which when in registered position, a portion of the fastening device may be extended, and after insertion partially rotated into a position in which it will engage the rear side of one of said members and be prevented from being withdrawn through the apertures by such engagement. The device is provided with a spring attached thereto and adapted to cooperate with the opposite side of the other member and to yieldingly hold the device in such position as to insure firm engagement of the inserted portion of the device with the rear side of the first mentioned member.

Referring to the drawing, the improved fastening device in its preferred form comprises a slotted screw blank 10 having a head 12 provided with a slot 13 in the top thereof for the reception of a screw driver or similar tool. The shank 15 of the screw blank is provided with a cross-bar 16 rigidly secured thereto to form part thereof, and in the embodiment of the invention illustrated in Figs. 2 and 4 the cross-bar 16 comprises a steel bar received within the slotted end of the shank 15 of the screw blank, and is electrically welded to the slotted ends in such position. Between the head of the screw blank and the cross-bar a relatively stiff coil spring 20 is positioned encircling the shank of the screw blank and prevented from being detached by the head of the screw blank and by the cross-bar.

In the preferred form of the invention the under surface of the head of the screw blank is tapered and cooperates with a washer 30 having a central hole 32 and a conical portion 33 surrounding the hole adapted to fit the tapered under side of the head. The washer comprises a spring retaining member and is positioned between the end of the spring and the under surface of the head of the screw blank to afford an improved bearing for the end of the spring and to permit a certain amount of universal movement between the head of the spring and the head of the screw blank during the use of the fastening device, as will be described. In addition the washer 30 serves to hide the spring and to improve the appearance of the device when in use.

In another modification of the present fastening device the cross-bar may be formed by cutting a slit 45 in the central portion of the end of the shank 15 of the screw blank to form two half sections, and then bending the half sections outwardly as illustrated in Fig. 3 to form the desired cross-bar. In manufacturing and assembling this form of fastening device, the screw blank with the slit in the central portion of the end of the shank may and preferably will be formed in an automatic screw machine in a rapid and economical manner and thereafter the screw retaining washer and the spring will be assembled in the manner above described upon the shank and then the half sections formed by the slit in the end of the shank will be bent outwardly to form the cross-bar in any suitable form of press.

The present fastening device may be used to fasten together most any objects having openings which are adapted to register and are of sufficient size and shape as to permit the cross-bar and shank of the screw blank to be extended through the aligned openings while preventing the cross-bar, when the fastening device is turned into a different position, from being withdrawn. The spring engages the outer surface of one of the members to be fastened and serves to efficiently hold the screw blank against the outer surface of the other member. The fastening device finds particular use in fastening together objects, one of which is provided with a slot and which objects are located in inaccessible positions which render it difficult to use of ordinary bolt and nut. As illustrated in Fig. 1 the present fastening device finds use in fastening the splash pan 50 to the frame 52 of an automobile. As the present time bolts and nuts are used for this purpose and the present devices not only may be installed with more convenience and more rapidly, but serves to hold the pan in place without liability of its rattling or becoming loosened.

The slotted screw blank 10 in either the form illustrated in Fig. 2 for use in producing the fastening device in which the cross-bar is welded in the slot, or the form illustrated in Fig. 3 in which the half sections formed by the slot are subsequently bent outwardly to form the cross-bar, may be as above stated rapidly and economically produced upon well-known types of automatic screw machines. After formation of the screw blanks, the spring retaining washer 30 and the spring 20 are assembled, or in some instances if desired a rubber or other flexible washer 51 may be hung on the shank of the screw blank and thereafter the cross-bar formed in the manner described by either the electrical welding of a steel bar positioned within the slot or by bending outwardly the half sections formed in the slotted end of the shank. In welding the cross-bar it is preferred to assemble a plurality of the screw blanks each with its spring retaining washer and spring slipped over the shank of the screw blank in a suitable holding device and to position a single elongated steel bar within all of the aligned slots in the ends of the shanks of the screw blanks. The bar may be clamped in such position and the several shanks welded to the bar in an ordinary electric welding machine. Thereafter the bar may be cut in a suitable press to form the individual cross-bar 16. It is preferred to provide an elongated groove as at 52 in the sides of the cross-bar 16 in order to assist in producing a strong welded joint.

As illustrated in Fig. 5 a modification of the present fastening device is shown which is particularly adapted for fastening the floor boards of motor vehicles, and in which a metal cup 60 hung on the shank of the screw blank of the fastening device is driven into a preformed hole in the floor board and held therein by barbs 62 stamped out of the same, as illustrated in Fig. 5. The cross-bar of the fastening device may be forced downwardly through a preformed slot in the bottom of the floor board and the frame of the vehicle and turned into a position to engage the frame. The metal cup 60 may also serve to receive the usual fastener 65 by which the mat covering the floor boards may be fastened.

It will also be observed that the end of the coil spring 20 is shaped to form in effect a cone which for some purposes is useful in engaging irregular shaped objects such as round or semi-round projections on articles to be fastened. The present fastening device may also be made in all machine screw sizes, as for example 12 ga.$\times \frac{5}{16}$. The device finds use for most all of the purposes for which bolts and nuts have heretofore been used. As for example, it may be used for holding motor pans, electrical boxes, cable boxes, hanging signs, in airplane construction, in building construction, and for various other purposes.

While the preferred embodiments of the invention have been herein illustrated and described, it is to be understood that the invention may be embodied in other forms within the scope of the following claims.

Having thus described the invention, what is claimed is:—

1. A self-contained, permanently assembled fastening device adapted for ready and universal use in fastening together suitably apertured members comprising a blank having a head provided with a tapering inner face and a shank extending from said face, a washer having an aperture of a size to loosely receive said shank and shaped adjacent the aperture to conform to said tapered face of the head so as to permit relative rocking and rotating movement between said washer and blank, said washer also having a groove formed therein and opening away from said head, a spring positioned on the shank and adapted to be substantially entirely concealed within said groove when the device is in use, and an enlargement associated with the free end of the shank for retaining the parts assembled and for completing the fastening device.

2. A self-contained, permanently assembled fastening device adapted for ready and universal use in fastening together suitably apertured members comprising, a blank having a head provided with a tapering inner face and a shank extending from said face, a washer shaped adjacent its aperture to conform to said tapered face of the head, said washer having an annular spring receiving seat formed therein to face away from said head and having a diameter substantially equal to the maximum diameter of the head, a coil spring positioned on said shank and having one end engaging said seat to be held out of contact with the shank when in use, said spring being adapted to engage a member to be fastened together to hold the washer out of contact with said member, and an enlargement associated with the free end of the shank for retaining the parts assembled and for completing the fastening device.

3. A self-contained, permanently assembled fastening device adapted for ready and universal use in fastening together a plurality of suitably apertured members comprising a blank having a head provided with a tapering inner face and a shank extending from said face, a washer shaped adjacent its aperture to conform to said tapered face of the head, and having a groove formed therein and opening away from said head, a spring positioned on the shank and adapted to be substantially entirely concealed within said groove and held out of contact with said shank when the device is in use, an element positioned on the shank and adapted to be interposed between the spring and the members fastened together to prevent contact of the spring with said members, and a transversely extending bar associated with the free end of said shank for retaining the parts assembled.

In testimony whereof I have signed my name to this specification.

WILLIAM F. LOUGHMAN.